US006867908B2

(12) United States Patent
Uemura et al.

(10) Patent No.: US 6,867,908 B2
(45) Date of Patent: *Mar. 15, 2005

(54) OPTICAL AMPLIFIER HAVING VARIOUS CONTROL CIRCUITRY

(75) Inventors: Aritomo Uemura, Tokyo (JP); Kiwami Matsushita, Tokyo (JP); Yukio Horiuchi, Saitama (JP); Masatoshi Suzuki, Saitama (JP); Noboru Edagawa, Saitama (JP); Shu Yamamoto, Saitama (JP); Shigeyuki Akiba, Saitama (JP)

(73) Assignees: Mitsubishi Denki Kabushiki Kaisha, Tokyo (JP); KDD Corporation, Tokyo (JP); KDD Submarine Cable Systems Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/401,748

(22) Filed: Mar. 31, 2003

(65) Prior Publication Data

US 2003/0184850 A1 Oct. 2, 2003

Related U.S. Application Data

(62) Division of application No. 09/725,288, filed as application No. PCT/JP00/02120 on Mar. 31, 2000, now Pat. No. 6,614,588.

(30) Foreign Application Priority Data

Mar. 31, 1999 (JP) ............................................ 11-092806

(51) Int. Cl.[7] ................................................ H01S 3/00
(52) U.S. Cl. .................................................... 359/337.1
(58) Field of Search .......................... 359/337.1, 341.3, 359/341.41, 341.42, 337.11; 398/6, 11, 18, 37, 178, 181

(56) References Cited

U.S. PATENT DOCUMENTS

| 4,995,100 A | | 2/1991 | Stallard et al. ............. 455/606 |
| 5,162,936 A | * | 11/1992 | Taga et al. ................... 398/177 |
| 5,459,328 A | | 10/1995 | Kadota et al. .............. 250/551 |
| 5,479,423 A | | 12/1995 | Tanikawa ....................... 372/6 |
| 5,510,925 A | * | 4/1996 | Suzuki et al. ................. 398/18 |
| 5,524,144 A | * | 6/1996 | Suzuki ........................ 398/181 |
| 5,726,794 A | * | 3/1998 | Tajima ....................... 359/249 |
| 5,875,046 A | * | 2/1999 | Tomooka et al. ........... 398/181 |
| 5,883,735 A | * | 3/1999 | Sugiyama et al. ..... 359/341.42 |
| 5,923,462 A | * | 7/1999 | van der Plaats ......... 359/341.3 |
| 6,023,366 A | | 2/2000 | Kinoshita ................... 359/341 |
| 6,067,187 A | * | 5/2000 | Onaka et al. .......... 359/337.11 |
| 6,348,987 B1 | * | 2/2002 | Tomofuji .................... 398/147 |
| 6,671,466 B1 | * | 12/2003 | Banerjee et al. .............. 398/79 |

FOREIGN PATENT DOCUMENTS

| JP | 635630 A | | 1/1988 | .......... H04B/3/44 |
| JP | 268167 A5 | | 10/1993 | .......... H04B/10/16 |
| JP | 08097490 A | | 4/1996 | .......... H01S/3/07 |
| JP | 11298419 A | * | 10/1999 | .......... H04B/10/17 |
| JP | 411298419 A | | 10/1999 | .......... H04B/10/17 |

* cited by examiner

Primary Examiner—Mark Hellner
Assistant Examiner—Deandra M. Hughes
(74) Attorney, Agent, or Firm—Birch, Stewart, Kolasch & Birch, LLP

(57) ABSTRACT

The optical amplifier according to the present invention is constructed such that the amount of the electric current fed to the power feeding line 2a is first detected by the current detection means, and then a setting signal is generated to each of the bypass circuits 22 and 23 in accordance with the thus detected amount of the fed current, and thereafter the output level of each of the optical repeater circuits 11 and 12 is controlled respectively by the bypass circuits 22 and 23, so that the output level of these repeater circuits 11 and 12 can be controlled in accordance with the amount of the current fed to the power feeding line 2a.

3 Claims, 4 Drawing Sheets

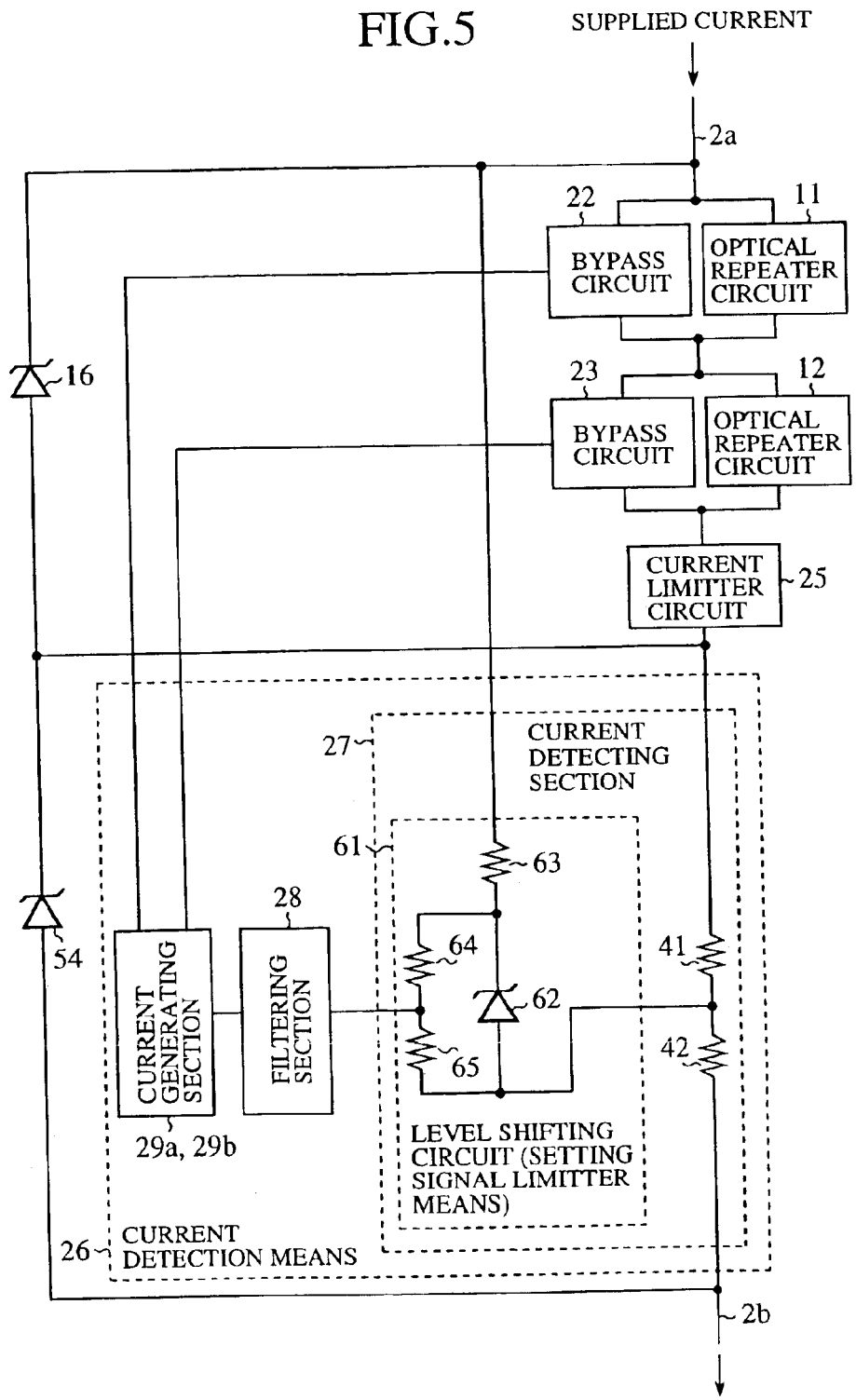

OPTICAL AMPLIFIER HAVING VARIOUS CONTROL CIRCUITRY

This application is a divisional of Ser. No. 09/725,288 now U.S. Pat. No. No. 6,614,588, which was filed on Nov. 29, 2000 and issued on Sep. 2, 2003, which is a continuation of International Appln. No. PCT/JP00/02120 filed on Mar. 31, 2000, the entire contents of which are hereby incorporated by reference and for which priority is claimed under 35 U.S.C. § 120; and this application claims priority of Application No. 11-092806 filed in Japan on Mar. 31, 1999, under 35 U.S.C. § 119.

BACKGROUND OF THE INVENTION

1. Field of the Invention

The present invention relates to an optical amplifier for repeating optical signals in an optical fiber system.

2. Description of the Related Art

FIG. 1 is a schematic diagram showing the configuration of a conventional optical fiber repeating and transmitting system, as disclosed, for example, in the Patent Application Laid-Open No. 5-268167. FIG. 2 is a schematic diagram showing the detailed configuration of each of the optical amplifiers therein. In FIG. 1, reference numerals 1a to 1c denote a plurality of optical amplifiers provided in series, numerals 2a to 2d denote power feeding lines, 3a to 3d and 4a to 4d all denote optical fibers, 5 denotes a constant-current power supply for providing a constant current to the power feeding line 2a, and numerals 6a and 6b denote optical transmission terminal devices, respectively provided at the transmission end and the reception end of the transmission system.

As shown above, in the transmission lines 3a to 3d and 4a to 4d connecting the optical transmission terminal devices 6a and 6b, a plurality of optical amplifiers 1a to 1c are provided in series, and the power feeding to each of these optical amplifiers 1a to 1c is carried out normally by a constant-current power feeding method, in which a constant direct current is fed by a constant-current power supply provided in the above transmission end or the reception end of the transmission system by way of the power feeding lines 2a to 2d.

In FIG. 2, numeral 1a denotes an optical amplifier, 2a and 2b denote power feeding lines, 3a, 3b, 4a and 4b denote optical fibers, numerals 11 and 12 denote optical repeater circuits for amplifying and repeating optical signals, 13 and 14 denote bypass circuits, which are connected respectively to the optical repeater circuits 11 and 12 in parallel for controlling the amount of current for driving the optical repeater circuits 11 and 12 (hereinafter referred to just as "drive current"), numeral 15 denotes a constant-current power supply connected to the optical repeater circuits 12 and the bypass circuit 14 in series, and numeral 16 denotes a constant-voltage diode connected in parallel to these repeater circuits 11 and 12, the bypass circuits 13 and 14, and the constant-current power supply 15.

Next, the operation of the conventional optical amplifier is now explained as follows.

The up-link optical signal input through the optical fiber 3a is amplified and repeated at the optical repeater circuit 12 and is output to the optical fiber 3b, whereas the down-link optical signal input through the optical fiber 4b is amplified and repeated at the optical repeater circuit 11 and is output to the optical fiber 4a.

On the other hand, the optical repeater circuit 11 and the optical repeater circuit 12 are connected to each other in series, and in each of the optical repeater circuits 11 and 12, the bypass circuits 13 and 14 for allowing all or one part of the fed current to pass through are connected in parallel respectively. Due to this, the current input through the power feeding line 2a is branched to the optical repeater circuit 11 and the bypass circuit 13, and also branched to the optical repeater circuit 12 and the bypass circuit 14.

To the optical repeater circuit 11 and the bypass circuit 14, the constant-current power supply 15 is further connected in series, so as to limit the maximum current flowing into the optical repeater circuits 11 and 12. To each of these optical repeater circuits 11 and 12, the bypass circuits 13 and 14 and also the constant-current power supply 15, the constant-voltage diode 16 is connected in parallel. This constant-voltage diode 16 bypasses the excess current when an excessive amount of current is flown into the power feeding line 2a, thereby to implement a stable operation thereof.

As the conventional optical amplifier is constructed as explained above, the operating state of the optical repeater circuits 11 and 12 is controlled to keep constant even when the current fed to the optical amplifier 1a is fluctuated, and due to this, the operating state of these optical repeater circuits 11 and 12 cannot be changed from outside. Subsequently, there has been such a problem that when a malfunction occurs to one of the optical amplifiers due to the long-term use of a transmission system, the output level of other normal state optical amplifiers cannot be changed and so on.

SUMMARY OF THE INVENTION

The present invention has been proposed to solve the problems aforementioned, and it is an object of the present invention to provide an optical amplifier which is capable of setting the output level of the optical repeater circuits therein in accordance with the amount of current fed to the optical amplifier.

In order to achieve the above objects, the optical amplifier according to a first aspect of the present invention is constructed such that it comprises: a bypass circuit for controlling the amount of the drive current of the optical repeater circuit on the basis of a setting signal, a voltage limiter circuit that is connected to the optical repeater means in parallel and limits the voltage applied to the optical repeater means, and a current detection means, which is connected in series to a parallel circuit composed of the optical repeater means and the voltage limitter circuit, detects the current amount fed to the parallel circuit, and generates a setting signal to the bypass circuit in accordance with the amount of the fed current thus detected.

Due to this construction, the current detection means generates a setting signal in accordance with the detected amount of the fed current, while the bypass circuit controls the amount of the drive current of the optical repeater circuit on the basis of the thus generated setting signal, so that such an effect that the output level of the optical repeater circuit can be controlled in accordance with the amount of the current fed to the device can be obtained.

Further, due to this construction, since not only the amount of current flown into the optical repeater, but that flown into the voltage limiter circuit can also be detected, total amount of the fed current can be accurately counted, so that a setting signal in accordance with the amount of the fed current can be generated efficiently.

Still further, due to this construction, an excess amount of current can be bypassed, so that a stable operation can be implemented.

The optical amplifier according to another aspect of the present invention further comprises a current limitter circuit, which is connected in series to the optical repeater means for limiting the current flowing into the optical repeater means.

Due to this construction, the maximum current flown into the optical repeater circuit can be suppressed, so that an unstable operation can be prevented.

The optical amplifier according to further aspect of the present invention is constructed such that current detection means further comprises a current detecting section for detecting the fed current, and a filtering section for smoothing a detection signal detected by the current detecting section.

Due to this construction, a fluctuation of the detection signal of the fed current can be smoothed, so that such an effect is obtained that a setting signal can be generated efficiently in accordance with the amount of the fed current.

The optical amplifier according to further aspect of the present invention is constructed such that the current detection means further comprises a current detecting section for detecting the fed current, an impedance converter for converting a detection signal detected by the current detecting section to a voltage signal of low impedance, and a current generating section for generating a current amount setting signal to the bypass circuit in accordance with the voltage thus converted by the impedance converter.

Due to this construction, the current generating section for generating a current amount setting signal to the bypass circuit can be implemented by a relatively simple structure in which only one impedance converter is provided.

The optical amplifier according to the present invention is constructed such that current detection means further comprises a current detecting section for detecting the fed current, an impedance converter for converting a detection signal detected by the current detecting section to a voltage signal of low impedance, and a current generating section for generating a current amount setting signal to the bypass circuit in accordance with the voltage thus converted by the impedance converter.

Due to this construction, the current generating section for generating a current amount setting signal to the bypass circuit can be implemented by a relatively simple structure in which only one impedance converter is provided.

The optical amplifier according to the present invention is constructed such that the current detection means further comprises a setting signal limiting means for making the bypass circuit generate a certain level of setting signal in the case where the amount of the detected fed current is less than a predetermined value.

Due to this construction, a certain level of setting signal is made generated in the bypass circuit in the case where the amount of the detected fed current is less than a predetermined value, so that the bypass circuit can be controlled efficiently.

BRIEF DESCRIPTION OF THE DRAWINGS

FIG. 5 is a schematic diagram showing the detailed configuration of an optical amplifier according to a second embodiment of the present invention.

DETAILED DESCRIPTION OF THE PREFERRED EMBODIMENTS

Several embodiments for carrying out best the present invention are now explained with reference to attached drawings, in order to explain the present invention to details.

[First Embodiment]

Figure 1:
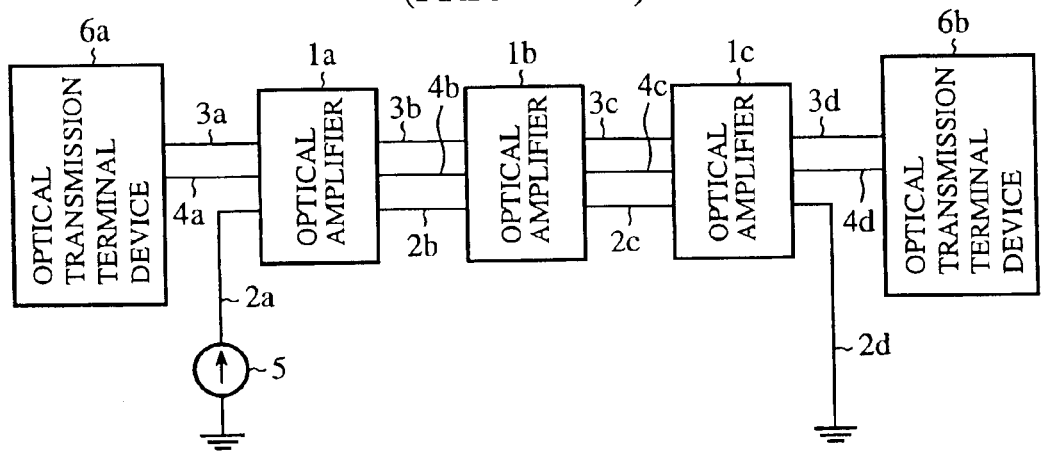
FIG. 1 is a schematic diagram showing the configuration of a conventional optical fiber repeater transmission system.
Figure 2:
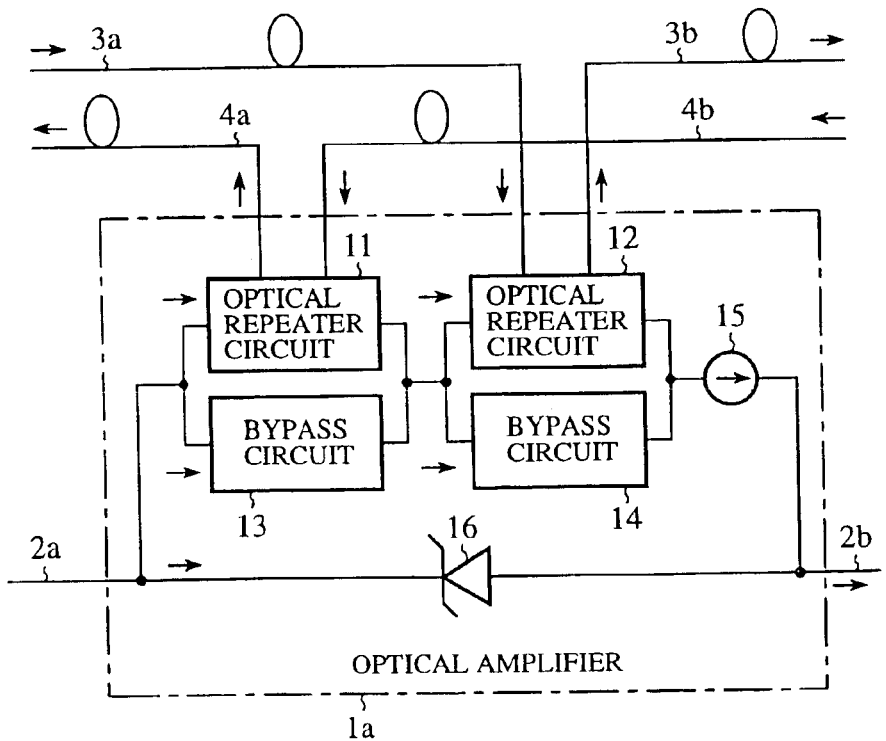
FIG. 2 is a schematic diagram showing the configuration of a conventional optical amplifier.
Figure 3:
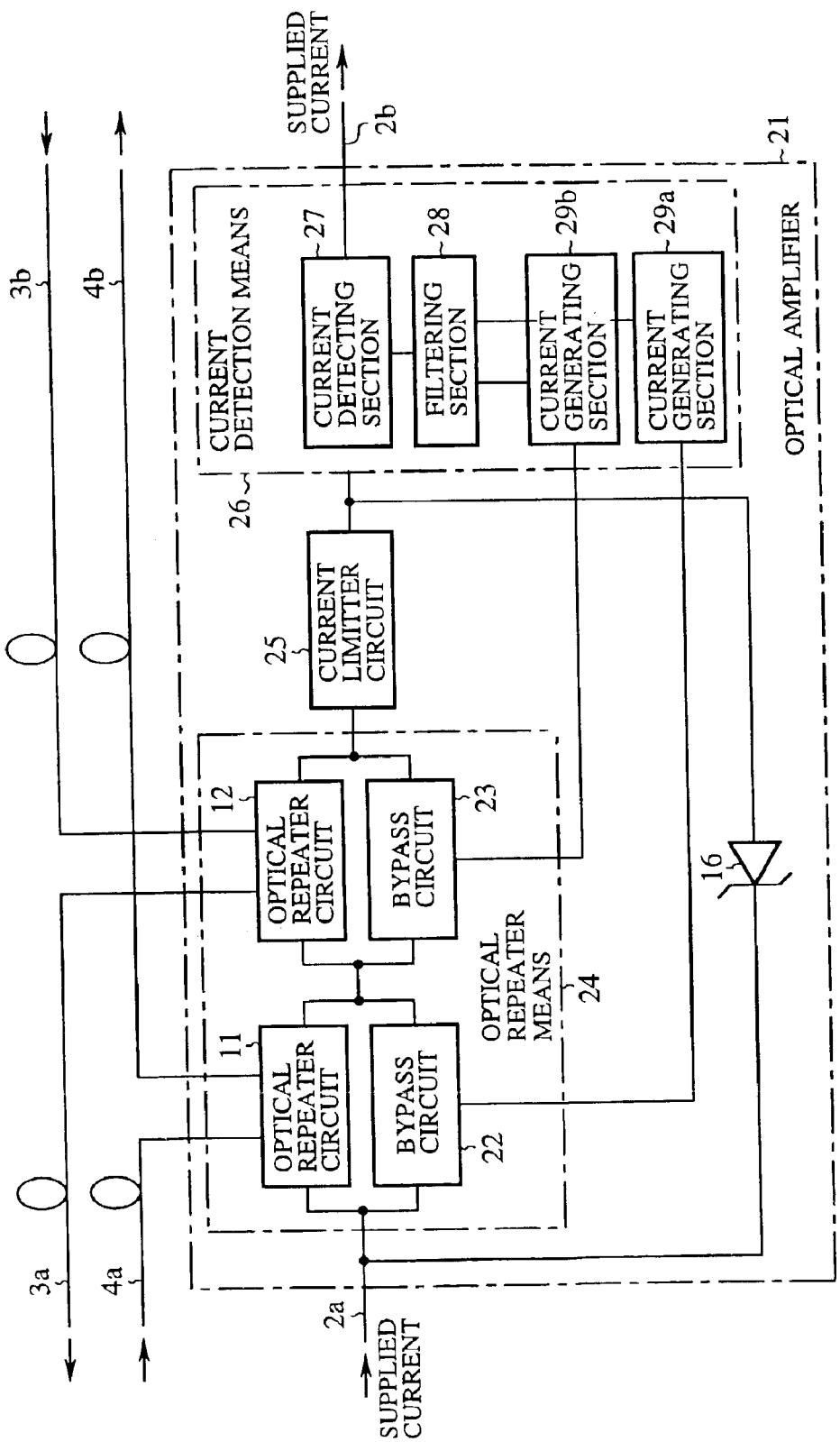
FIG. 3 is a schematic diagram showing the configuration of an optical amplifier according to a first embodiment of the present invention.

FIG. 3 is a schematic diagram showing the configuration of an optical amplifier according to a first embodiment of the present invention. In the figure, reference numeral 21 denotes an optical amplifier, numerals 2a and 2b denote power feeding lines, numerals 3a, 3b, 4a and 4b denote optical fibers, 11 and 12 denote optical repeater circuits for amplifying and repeating optical signals, and numerals 22 and 23 denote bypass circuits, which are connected respectively to the optical repeater circuits 11 and 12 in parallel for controlling the amount of the drive current of the optical repeater circuits 11 and 12, wherein these optical repeater circuits 11 and 12, and the bypass circuits 22 and 23 configure together the optical repeater means 24.

Numeral 25 denotes a current limitter circuits connected in series to the optical repeater means 24, and limits the current flowing into the optical repeater means 24, numeral 16 denotes a constant-voltage diode (a voltage limitter circuit) which is connected to these optical repeater means 24 and the current limitter circuit 25 in parallel and limits the voltage applied to the optical repeater means 24.

Further, numeral 26 denotes a current detection means which is connected in series to a parallel circuit composed by the optical repeater means 24, the current limitter circuit 25 and the constant-voltage diode 16, and detects the amount of current fed to this parallel circuit (hereinafter may be referred to just as a "fed current"), and thereafter generates setting signals to each of the bypass circuits 22 and 23 in accordance with the thus detected amount. In this current detection means 26, numeral 27 denotes a current detecting section for detecting the fed current, numeral 28 denotes a filtering section for smoothing the signal thus detected by the current detecting section 27, numerals 29a and 29b denote current generating sections for generating setting signals to be sent to the bypass circuits 22 and 23 on the basis of the detected signal thus smoothed by the filtering section 28.

Next, the operation of the optical amplifier according to a first embodiment of the present invention is now explained as below.

The up-link optical signal input by way of the optical fiber 4a is first amplified and repeated at the optical repeater circuit 11, and thereafter output to the optical fiber 4b, whereas the down-link optical signal input by way of the optical fiber 3b is first amplified and repeated at the optical repeater circuit 12, and thereafter output to the optical fiber 3a.

On the other hand, the optical repeater circuit 11 and the optical repeater circuit 12 are connected in series to each other, and to each of the optical repeater circuits 11 and 12, the bypass circuits 22 and 23 for allowing all or one part of the fed current pass through are connected in parallel, respectively. To the optical repeater means 24, the current limitter circuit 25 is further connected in series, and these are connected in parallel to the constant-voltage diode 16 as a load circuit. Due to this, the current limitter circuit 25 limits the maximum current flown into the optical repeater circuits 11 and 12. Besides, the constant-voltage diode 16 bypasses the excess current when an excessive amount of current is flown into the power feeding line 2a, thereby to make the whole operation stable.

Further the amount of current fed to the power feeding line 2a is detected at the current detecting section 27 within the current detection means 26. The thus detected amount of fed current is smoothed in the filtering section 28 so that unnecessary fluctuated components are removed here in order to control the output level of the optical repeater circuits 11 and 12. Each of the current generating sections 29a and 29b generates a setting signal as a current signal, which can be a base to be referred when each of the bypass circuits 22 and 23 controls the output level of the respective repeater circuits 11 and 12 on the basis of the detected signal smoothed at the filtering section 28. The bypass circuits 22 and 23 control the amount of current to be branched to the optical repeater circuits 11 and 12 on the basis of the setting signals generated respectively by these current generating sections 29a and 29b, and adjusts thereby the amount of drive current of the optical repeater circuits 11 and 12 to control the output level thereof.

Since each of the setting signals which can be a base for the bypass circuits 22 and 23 is adjusted in accordance with the amount of current fed to the power feeding line 2a, the output level of the optical repeater circuits 11 and 12 can be controlled in accordance with the amount of the current fed thereto.

It is to be noted that specially in a submarine cable system or the like, there is a case in which a sinusoidal modulation is applied to the fed current for another purpose apart from setting of the output level of the optical repeater circuits 11 and 12. However, the current limiter circuit 25 and the constant-voltage diode 16 according to the present embodiment can prevent a malfunction or instable operation of the device, which can be caused by the fact that en excessive amount of current is flown into the optical repeater circuits 11 and 12 when this modulation of the fed current is implemented.

Further, the filtering section 28 of this embodiment can remove the modulated components from the detected signal when the modulation of the fed current is implemented, and can stabilize the operation of the optical repeater circuits 11 and 12.

Figure 4:
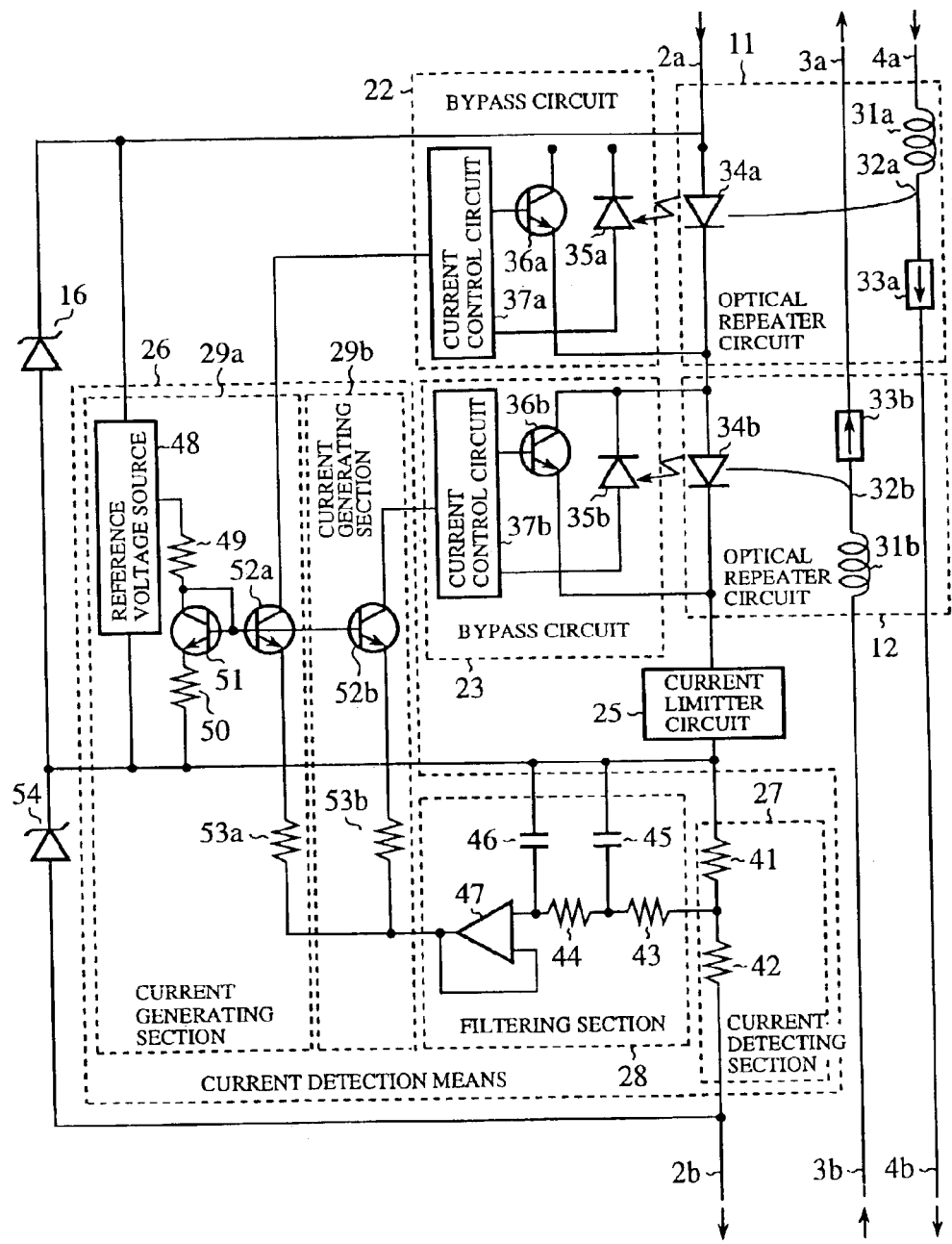
FIG. 4 is a schematic diagram showing the detailed configuration of the optical amplifier.

FIG. 4 is a schematic diagram showing one example of the detailed configuration of the optical amplifier in the case where it is applied to the optical amplifying and repeating system using therein rare earth doped optical fibers. In the optical repeater circuits 11 and 12, numerals 31a and 31b denote rare earth dopes optical fibers, 32a and 32b denote optical couplers, 33a and 33b denote optical isolators, and numerals 34a and 34b denote light exciting source. Further, in the bypass circuits 22 and 23, numerals 35a and 35b denote light receiving elements, 36a and 36b denote transistors, and numerals 37a and 37b denote current limitter circuits.

Further, in the current detecting section 27 of the current detection means 26, numerals 41 and 42 denote resistors for converting the amount of the fed current to that of the voltage, and in the filtering section 28, numerals 43 and 44 denote resistors, and 45 and 46 denote capacitors, smoothing together the detected signals. Numeral 47 denotes an impedance converter for converting the smoothed signal to a voltage signal of low impedance. Further, in the current generating sections 29a and 29b, numeral 48 denotes a reference voltage source, 49 and 50 denote resistors, 51 denotes a transistor for setting the reference current, 52a and 52b denote transistors for generating respectively setting signals, and numerals 53a and 53b denote resistors for converting the voltage signal from the impedance converter 47 to the setting signals. Still further, numeral 54 denotes a constant-voltage diode connected in series to the constant-voltage diode 16.

Next, the operation of the optical amplifier configured as above is now explained as below.

In the following, the operations of the optical repeater circuit 11 used in the up link, and the bypass circuit 22 thereof are explained. However, since they are same as those of the optical repeater circuit 12 used in the down link and the bypass circuit 23 thereof, the detailed explanation thereabout is omitted here.

First of all, the operation of the optical repeater circuit 11 is explained.

The rare earth doped optical fiber 31a is made, for example, by doping erbium, which is one of the earth elements, to a single-mode optical fiber of several meters to several-ten meters. To this rare earth doped optical fiber 31a, an optical coupler 32a is connected. The light exciting source 34a is, for example, a semiconductor laser (LD) of 1.48 $\mu$m wavelength band or of 0.98 $\mu$m wavelength band, and its output light is transmitted to the rare earth doped optical fiber 31a. When the light output from the light exciting source 34a is transmitted to the rare earth doped optical fiber 31a, the rare earth doped optical fiber 31a is put into an inverted distribution state, and an up-link signal of the 1.55 $\mu$m wavelength band which is input by way of the optical fiber 4a is first amplified by the dielectric discharging operation, and thereafter output to the optical fiber 4b by way of the optical isolator 33a.

Next, the operation of the bypass circuit 22 is explained as below.

The transistor 36a for the side-current flow is made such that its collector is connected to the anode of the light exciting source 34a, and its emitter is connected to the cathode of the same, wherein the total sum of the current flowing into the light exciting source 34a and that in the transistor 36a is limited to the level below a predetermined value by the current limiter circuit 25. Further, the light receiving element 35a receives one part of the output of the light exciting source 34a, and a received-light current corresponding to the amount of the thus received light is fed to the current control circuit 37a. This current control circuit 37a inputs the received-light current from the light receiving element 35a, and controls the current to be output to the base of the transistor 36a in accordance with the difference between the amount of the received-light current and that of the setting signal received from the later-explained current generating section 29a. Here, the current control circuit 37a performs a negative feedback control to the current of the transistor 36a so as to keep the received-light current from the light receiving element 35a to a constant level, and by this operation, the output light amount of the light exciting source 34a is kept to a constant level.

Next, the operation of the current detection means 26 is explained as below.

The fed current flown into the optical repeater circuits 11 and 12, the bypass circuits 22 and 23, the current limiter circuit 25 and to the constant-voltage diode 16 are all joined once, and thereafter converted to a voltage signal in the resistor 41 configuring the current detecting section 27 and input to the filtering section 28. In the filtering section 28, first the unnecessary voltage fluctuation is smoothed by the resistors 43, 44, and the capacitors 45 and 46, and thereafter the thus smoothed voltage signal is input to the current generating section 29a as a voltage signal of low impedance by the impedance converter 47.

The current generating section 29a converts the voltage signal from the filtering section 28 to a setting signal of the current amount. The base potential of the transistor 51 is kept constant by the output voltage of the reference voltage source 48, and the resistors 49 and 50, and is input to the base of the transistor 52a. The collector current of the transistor 52a is determined by the base voltage, the output voltage of the filtering section 28 and the resistance value of the resistor 53a connected to its emitter, and is transmitted as a setting signal of the current amount to the bypass circuit 22. Thus, the current amount of this setting signal is increased in proportion to the increased amount of the fed current.

Further, the constant-voltage diode 54 connected to the current detection means 26 in parallel by passes the excess current when an excessive amount of current is flown into the power feeding line 2a, just as the case of the constant-voltage diode 16, so as to protect the current detection means 26 and at the same time implement its stable operation.

As explained above, since the optical amplifier according to this first embodiment is configured by the current detection means 26, which detects the amount of current fed to the power feeding line 2a and generates setting signals to the bypass circuits 22 and 23 in accordance with the thus detected current amount, and the bypass circuits 22 and 23 which control the output level of the optical repeater circuits 11 and 12 in accordance with thus provided setting signals, so that the output level of the optical repeater circuits 11 and 12 can be controlled in accordance with the amount of the fed current.

Further, the current detection means 26 is configured to be connected in series to the parallel circuit, which is composed of the optical repeater means 24, the current limiter circuit 25 and also the constant-voltage diode 16, and due to this, not only the amount of the fed current flown into the serial circuit composed of the optical repeater means 24 and the current limiter circuit 25, but also the amount of the fed current flown into the constant-voltage diode 16 can be detected, so that such an effect is also obtained that the a setting signals in accordance with the amount of the fed current can be accurately generated.

Still further, since it is configured such that the current limitter circuit 25 is connected in series to the optical repeater means 24, the maximum current amount flown into the optical repeater circuits 11 and 12 can be limited, and thus such an effect that an instability of the operation can be prevented as a whole can be obtained.

Still further, since the constant-voltage diode 16 is connected in parallel to the optical repeater means 24 and the current limiter circuit 25, even when an excessive amount of current is flown into the power feeding line 2a, the excess current is bypassed by the constant-voltage diode 16, so that a stable operation can be implemented.

Still further, since the signal detected by the current detection means 27 is smoothed in the filtering section 28, the fluctuation of the detected signal of the fed current can be smoothed, so that such an effect that the setting signals can be generated accurately in accordance with the fed current is obtained.

Note that the configuration of the current limitter circuit 25, the constant-voltage diode 16 and the filtering section 28 is specially effective when applying a sinusoidal modulation to the fed current amount in a submarine cable system or the like.

Still further, since it is configured such that the voltage signal smoothed by the filtering section 28 is first converted to a voltage signal of low impedance by the impedance converter 47 and input to the current generating section 29a, in the current generating sections 29a and 29b of the next stage, only by providing the resistors 53a and 53b, the voltage signal is converted to a current signal so as to generate and transmit the setting signals to the bypass circuits 22 and 23. In other words, only by providing one impedance converter 47, the circuit elements for generating the setting signals to a plurality of bypass circuits can be implemented by a comparatively simple configuration such as the resistors 53a and 53b.

[Second Embodiment]

FIG. 5 is a schematic diagram showing the detailed configuration of an optical amplifier according to a second embodiment of the present invention. In the figure, numeral 61 denotes a level shift circuit setting signal limiter means which is provided in the current detecting section 27 and generates determined setting signals to the bypass circuits 22 and 23 in the case where the fed current thus detected by the current detecting section 27 is less than a predetermined level. In this level shift circuit 61, numeral 62 denotes a constant-voltage diode for shifting the detected voltage in proportion to the amount of the fed current detected by the resistors 41 and 42, numeral 63 denotes a resistor, and numerals 64 and 65 denote resistors for dividing the detected voltage which has been shifted by the constant-voltage diode 62.

Since other configuration is same as that of FIG. 4 as shown in the first embodiment, the detailed explanation thereabout is omitted here.

Next, the operation of the optical amplifier according to the second embodiment is now explained as shown below.

The detected voltage generated by the resistor 41 in the current detecting section 27 becomes the one in proportion to the current amount fed to the power feeding lines 2a and 2b. In FIG. 4 of the first embodiment, the voltage signal made by smoothing this detected voltage is output from the filtering section 28, and in the current generating section 29a, there occurs a potential difference between the base voltage of the transistor 52a and the detected voltage even when the amount of the fed current is zero, so that the setting signal which is not zero is output from the current generating section 29a.

On the other hand, the current detecting section 27 as shown in FIG. 5 of the this second embodiment is configured by the resistors 41 and 42, and also the level shift circuit 61. In the level shift circuit 61, because of the constant-voltage diode 62 and the resistor 63, the current voltage of the fed current detected by the resistor 41 is shifted for the value of the constant-voltage diode 62, and further, the voltage of the constant-voltage diode 62 is divided by the resistors 64 and 65, and due to these operations, an arbitrary level shifting is made possible. By all this above, the current generating sections 29a and 29b are provided with a detection signal to which an off-set corresponding to the shifted value is given, so that by adjusting the breakdown voltage of the constant-voltage diode 62, an offset can be given to the relation between the amount of the fed current and the setting signals generated by the current generating sections 29a, 29b.

For example, in the case where the amount of the fed current is below a predetermined level at which the operation of the bypass circuit 22 is instable, the setting signal "0" can be output to the current control circuit 37a by setting the breakdown voltage of the constant-voltage diode 62 by use of the detected voltage shifted by the constant-voltage diode 62 in such a manner that the output potential of the impedance converter 47 shown in FIG. 4 is made higher than the base voltage of the transistor 52a.

As explained heretofore, according to this second embodiment of the present invention, since the level shift circuit 62 is provided, which makes each of the bypass circuits 22 and 23 generate a certain level of setting signal in the case where the detected fed current amount is less than a predetermined level, when the amount of the fed current is less than a predetermined level, in which the bypass circuits 22 and 23 operates instably, certain level of setting signals are generated by the bypass circuits 22 and 23, so that the bypass circuits 22 and 23 can be controlled in a good state.

Note that the above second embodiment has been explained as to the case where the current detecting section 27 is provided with the level shift circuit 61. However, the level shift circuit 61 can be provided in any position as long as it is in the current detection means 26, and even if it is provided in other filtering section 28, the current generating sections 29a and 29b, the same effect can be attained.

Still further, the above first and second embodiments have been explained as to the case where altogether two of the optical repeater circuits 11 and 12, namely for the up link and down link, are employed. However, even in the case where there are more optical repeater circuits, for example including the one for spare use is considered, the same effect can be attained by the similar configuration. For example, in the optical repeater means 24 as shown in FIG. 3, the parallel circuit configured by the optical repeater circuit 11 and the bypass circuit 22, and another parallel circuit configured by the optical repeater circuit 12 and the bypass circuit 23, are connected in series. However, even such configurations as the one made by a plurality of series-connected pairs of the parallel circuits, or the one made by a plurality of series-connected and also parallel-connected pairs of the parallel circuits and so on, the same effect can be obtained.

Still further, these embodiments have been explained as to the case where the exciting direction of the excited light to be input to the rare earth doped optical fibers 31a and 31b is opposite to the direction of the signal light. However, exactly the same effect can be obtained even when the direction is the same.

Yet still further, these embodiments have been explained as to the case where the monitor-use photo-diodes are used within the laser module as the light receiving elements 35a and 35b for monitoring the output light of the light exciting sources 34a and 34b, so as to monitor the output strength of the light exciting sources 34a and 34b. However, in order to obtain the same effect, it can be replaced by such a configuration that the output strength of each of the light exciting sources 34a and 34b is monitored by branching one part of each of the outputs of the optical repeater circuits 11 and 12, and monitoring the output level itself of the signal light.

As explained heretofore, the optical amplifier according to the present invention is suitable to an optical fiber communication system that enables a long-distance optical signal transmission by amplifying and repeating optical signals, wherein the current amount provided to the optical amplifier is detected and the output level of the optical repeater circuit is controlled.

What is claimed is:

1. An optical repeating system comprising:
    a plurality of optical amplifiers connected by a power feeding line, wherein each of the optical amplifiers includes:
        a current generator for generating a variable setting signal based on a current amount of the power feeding line; and
        an optical repeater circuit for amplifying and repeating input optical signals in accordance with the variable setting signal so that a gain of the optical repeater circuit is controlled by said current amount.

2. The optical repeating system according to claim 1, wherein the current amount of the power feeding line can be selectively varied.

3. The optical repeating system according to claim 1, wherein the power feeding line is an electrical transmission path.

* * * * *